B. MORRILL.
Platform Balance.
No. 3,111.
Patented May 26, 1843.
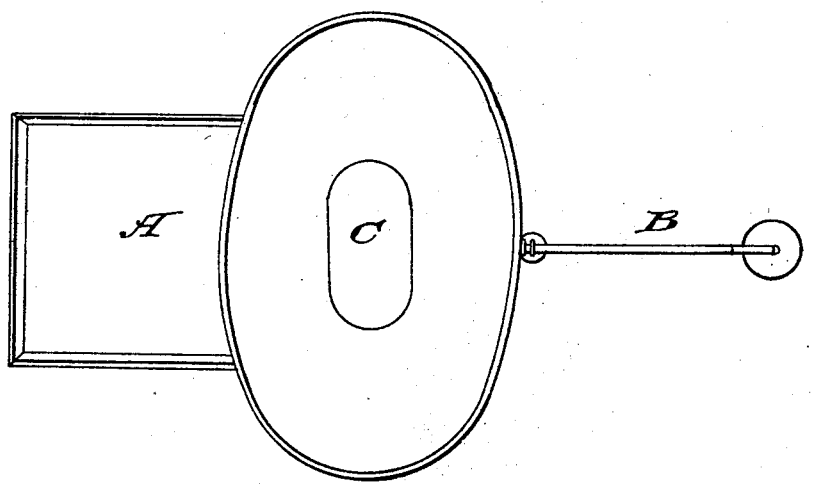
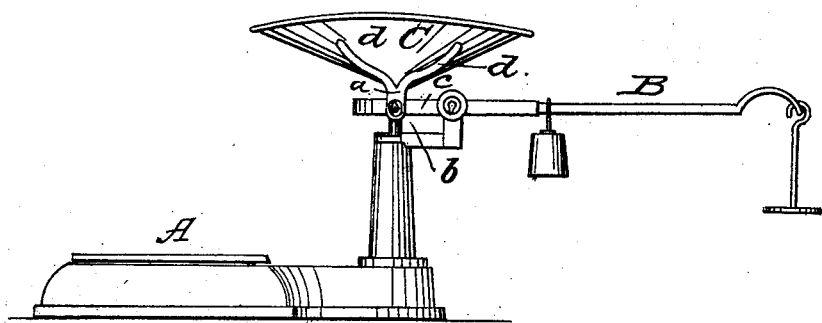

UNITED STATES PATENT OFFICE.

BENJAMIN MORRILL, OF BOSCAWEN, NEW HAMPSHIRE.

BALANCE.

Specification of Letters Patent No. 3,111, dated May 26, 1843.

*To all whom it may concern:*

Be it known that I, BENJAMIN MORRILL, of Boscawen, in the county of Merrimack, of the State of New Hampshire, have invented a certain new and useful Improvement in Balances for Weighing, and that the following specification of the same, taken in connection with the accompanying drawings, fully sets forth the nature and principles thereof, by which it may be distinguished from others of like character.

Of the drawings, above mentioned, Figure 1 represents a top view, and Fig. 2 a side elevation of a portable platform balance, having my improvement applied to it.

In this balance A, Figs. 1, 2, denotes the platform, which is mounted upon a system of levers which connect with a steelyard or graduated weighing lever B, and are otherwise arranged and operate in a similar manner to those in common use.

My improvement consists in applying upon the cross bar $a$ of the vertical rod $b$ of the platform levers, or that bar which rests upon the knife edges of the short arm $c$ of the steelyard or weighing lever, an elliptical or other proper shaped part C which rests upon supports $d$, $d$ projecting from the cross bar $a$. This pan serves for weighing light or powdered articles such as sugar, flour, &c. or those which it may be inconvenient or difficult to weigh upon the platform A. By this arrangement of the scale pan upon the steelyard we obtain a combination or union of the pan and platform, thus producing an article exceedingly useful for the purposes of weighing. By a proper arrangement of weights and graduations upon the steelyard the balance is rendered very delicate or quite as much so as can be desirable for the uses to which it is generally applicable.

Having thus set forth my invention I shall claim—

The combination of the pan C with the steelyard of a platform balance, thus forming a union of pan and platform upon one graduated weighing lever; the said pan being applied to the said steelyard or upon the cross bar of the vertical rod of the platform levers, and otherwise arranged substantially in the manner and for the purpose as hereinbefore described.

In testimony that the above is a correct specification of my said invention I have hereunto set my signature this third day of May of the year one thousand eight hundred and forty-three.

BENJAMIN MORRILL.

Witnesses:
RICHARD G. COLBY,
JOHN B. CARLE.